US009582009B2

(12) United States Patent
Shahapurkar et al.

(10) Patent No.: US 9,582,009 B2
(45) Date of Patent: Feb. 28, 2017

(54) SYSTEM AND METHOD FOR OPTIMIZING AND REDUCING THE ENERGY USAGE OF AN AUTOMATICALLY CONTROLLED HVAC SYSTEM

(71) Applicant: SmrtEn, LLC, Chandler, AZ (US)

(72) Inventors: Som Shahapurkar, Chandler, AZ (US); Rana J. Pratap, Chandler, AZ (US)

(73) Assignee: SMRTEN, LLC, Chandler, AZ (US)

( * ) Notice: Subject to any disclaimer, the term of this patent is extended or adjusted under 35 U.S.C. 154(b) by 0 days.

(21) Appl. No.: 13/871,168

(22) Filed: Apr. 26, 2013

(65) Prior Publication Data
US 2013/0238144 A1 Sep. 12, 2013

Related U.S. Application Data

(60) Provisional application No. 61/640,590, filed on Apr. 30, 2012.

(51) Int. Cl.
G05B 21/00 (2006.01)
G05B 13/00 (2006.01)
G05D 23/00 (2006.01)
G05D 23/19 (2006.01)
F24F 11/00 (2006.01)

(52) U.S. Cl.
CPC ............ *G05D 23/19* (2013.01); *F24F 11/006* (2013.01); *F24F 11/0009* (2013.01); *G05D 23/1923* (2013.01); *F24F 2011/0047* (2013.01); *F24F 2011/0075* (2013.01)

(58) Field of Classification Search
CPC ............... G05D 23/1917; G05D 23/19; G05D 23/1923; F24F 11/006; F24F 11/0009; F24F 2011/0047; F24F 2011/0075
USPC .................................................. 700/278–293
See application file for complete search history.

(56) References Cited

U.S. PATENT DOCUMENTS

| 7,861,941 | B2 | 1/2011 | Schultz |
| 8,010,237 | B2 | 8/2011 | Cheung |
| 8,019,567 | B2 | 9/2011 | Hublou |
| 8,090,477 | B1* | 1/2012 | Steinberg ........... G05D 23/1923 700/276 |
| 2007/0043478 | A1* | 2/2007 | Ehlers .................. F24F 11/0012 700/276 |
| 2008/0217419 | A1* | 9/2008 | Ehlers et al. ............... 236/44 C |

(Continued)

Primary Examiner — Ziaul Karim
(74) Attorney, Agent, or Firm — Wright Law Group, PLLC; Mark F. Wright

(57) ABSTRACT

System and method for optimizing and reducing the energy usage of an automatically controlled heating, ventilation and air conditioning ("HVAC") System. The system and method comprise receiving, from a server, a plurality of parameters, the parameters comprising an internal temperature of a structure, an external temperature, a utility pricing structure, and/or a user preference. The system and method may receive, by the server, a plurality of historical data related to the HVAC system and may generate a model. The model may be configured to determine a change to an operational state of the HVAC system needed to obtain an internal temperature set point. The model may be generated using a plurality of parameters received. The model may be revised iteratively. The system and method may receive, by the server, a plurality of additional parameters to revise the model. A signal may be set, by a server, to the HVAC system.

20 Claims, 6 Drawing Sheets

(56) References Cited

U.S. PATENT DOCUMENTS

| | | | |
|---|---|---|---|
| 2011/0061015 A1* | 3/2011 | Drees | G05B 15/02 715/771 |
| 2011/0106327 A1* | 5/2011 | Zhou | G05B 13/024 700/291 |
| 2011/0251730 A1* | 10/2011 | Pitt | 700/291 |
| 2011/0307103 A1* | 12/2011 | Cheung et al. | 700/278 |
| 2012/0065783 A1* | 3/2012 | Fadell | F24F 11/006 700/276 |
| 2012/0101648 A1* | 4/2012 | Federspiel et al. | 700/291 |
| 2012/0290230 A1* | 11/2012 | Berges Gonzalez et al. | 702/61 |
| 2013/0085616 A1* | 4/2013 | Wenzel | 700/278 |
| 2013/0313331 A1* | 11/2013 | Warren | F24F 11/0012 236/1 C |

* cited by examiner

SYSTEM AND METHOD FOR OPTIMIZING AND REDUCING THE ENERGY USAGE OF AN AUTOMATICALLY CONTROLLED HVAC SYSTEM

CROSS REFERENCE TO RELATED APPLICATION

This application claims priority to U.S. provisional application No. 61/640,590 entitled, "System and Method for Optimizing and Reducing the Energy Usage or Cost of an Automatically Controlled HVAC System."

BACKGROUND OF THE INVENTION

Field of the Invention

The present invention relates to a system and method for optimizing and reducing the energy usage or cost of operation of an automatically controlled heating, ventilation, and air conditioning ("HVAC") system. The system and method may utilize a networked HVAC system to determine the necessary changes needed to reach a certain set point. The set point may be determined by optimization based on a model generated by the system and method from a plurality of factors. The model may be revised to incorporate an additional set of data to optimize and reduce energy usage and cost.

Description of Related Art

Prior art exists for systems and methods for automatically controlled HVAC systems. Prior art teaches HVAC systems which may be configured to automatically adjust the set point with respect to a predetermined setting. Prior art teaches HVAC systems which may use additional parameters to determine necessary changes the HVAC system needs to undertake to reach a certain set point. Prior art also teaches the use of a network in connection with an HVAC system to manage data related to the HVAC system.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Pat. No. 8,010,237 to Cheung et al describes systems and methods for using ramped set point temperature variation with networked thermostats to improve efficiency. This invention teaches the use of a networked thermostat to manage the set point of an HVAC system.

U.S. Pat. No. 8,019,567 to Steinberg et al describes systems and methods for evaluating changes in the efficiency of an HVAC system. This invention teaches the method of determining a cause of the degradation to an HVAC system.

U.S. Pat. No. 7,861,941 to Schultz et al describes an automatic thermostat schedule/program selector system. This invention teaches the use of one or more schedulers to determine the necessary changes to an HVAC system.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

BRIEF SUMMARY OF THE INVENTION

The present invention provides among other things a system and method for optimizing and reducing the energy usage of an automatically controlled HVAC system. The system and method comprise a method for optimizing and reducing the energy usage or cost of operation of an automatically controlled HVAC system. The method may comprise receiving, from a server, a plurality of parameters, the parameters comprising at least one of an internal temperature of a structure, an external temperature, a utility pricing structure, and a user preference. The method may further comprise receiving, by the server, a plurality of historical data related to the HVAC system and generating, by the server, a model configured to determine a change to an operational state of the HVAC system needed to obtain an internal temperature set point. The model may be further configured to be generated using a plurality of model parameters comprising at least one of the internal and external temperatures of the structure, the utility pricing structure, the user preference and the plurality of historical data related to the HVAC system. The method may further comprise iteratively processing the model, by the server, using a result of a previously generated model and a plurality of additional parameters. The method may further comprise sending, by the server, a signal to the HVAC system, the signal configured to affect a current operational state of the HVAC system. The internal temperature may be received from a plurality of HVAC systems within a single structure. The external temperature may be configured to be determined by a plurality of external temperature parameters that comprises at least one of an external temperature, a humidity rating, and a cloud coverage rating. The user preference may comprise at least one of a comfort and tolerance level, a time of day setting, and an activity setting. The historical data related to the HVAC system may comprises at least one of historical internal and external temperatures, historical weather conditions, historical user preferences, and historical utility pricing structures. The additional parameters may comprise at least one of a future utility pricing structure, a future user preference, and a future weather condition. The utility pricing may be received from a plurality of sources comprising at least one of a utility company, a website, and a user input. The external temperature and future weather conditions may be configured to be received from a plurality of sources, comprising at least one of a weather station, a website, and a utility company. The current operational state of the HVAC may comprise an ON state, an OFF state, and a MAINTAIN state wherein the current operational state of the HVAC remains unchanged. The signal to the HVAC system may be an optimized set point that reduces the energy usage or cost of operation while maintaining comfort bounds set by the user preference for the internal temperature. The signal to the HVAC system may be an optimized set point, the set point parameters computed using a genetic algorithm.

In further embodiments, the invention may comprise a system of processor-executable instructions that when executed by a server, optimize and reduce the energy usage or cost of operation of an automatically controlled HVAC system by instructing the server to receive a plurality of parameters, the parameters comprising at least one of an internal temperature of a structure, an external temperature, a utility pricing structure, and a user preference. The system may generate a model configured to determine a change to an operational state of the HVAC system needed to obtain an internal temperature set point. The model may be further configured to be generated using a plurality of model parameters comprising at least one of the internal and external temperatures of the structure, the utility pricing structure, the user preference and the plurality of historical data related to the HVAC system. The system may iteratively process the model, by the server, using a result of a previously generated model and a plurality of additional parameters, and send a signal to the HVAC system, the signal configured to affect a current operational state of the HVAC system.

In other embodiments of the system of processor-executable instructions, the external temperature may configured to be determined by a plurality of external temperature parameters, comprising at least one of an external temperature, a humidity rating, and a cloud coverage rating. The user preference may comprises at least one of a comfort and tolerance level, a time of day setting, and an activity setting. The historical data related to the HVAC system may comprise at least one of historical internal and external temperatures, historical weather conditions, historical user preferences, and historical utility pricing structures. The additional parameters may comprise at least one of a future utility pricing structure, a future user preference, and a future weather condition. The utility pricing may be received from a plurality of sources comprising at least one of a utility company, a website, and a user input. The external temperature and future weather conditions may be configured to be received from a plurality of sources, comprising at least one of a weather station, a website, and a utility company. The current operational state of the HVAC may comprise an ON state, an OFF state, and a MAINTAIN state wherein the current operational state of the HVAC remains unchanged. The signal to the HVAC system may be an optimized set point. The set point parameters may be computed using a genetic algorithm.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above. Further, the inventors are fully informed of the standards and application of the special provisions of 35 U.S.C. §112 (f). Thus, the use of the words "function," "means" or "step" in the Detailed Description or Description of the Drawings or claims is not intended to somehow indicate a desire to invoke the special provisions of 35 U.S.C. §112 (f), to define the invention. To the contrary, if the provisions of 35 U.S.C. §112 (f) are sought to be invoked to define the inventions, the claims will specifically and expressly state the exact phrases "means for" or "step for, and will also recite the word "function" (i.e., will state "means" for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112 (f). Moreover, even if the provisions of 35 U.S.C. §112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
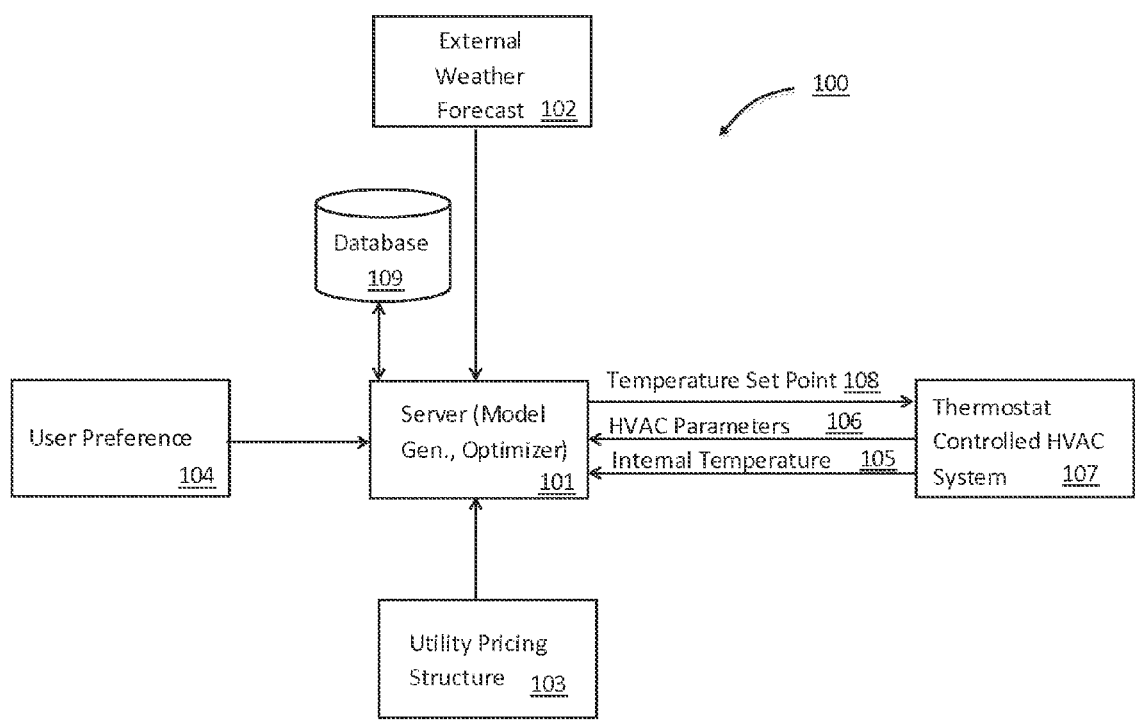
FIG. 1 depicts a block diagram of an implementation of a system for optimizing or reducing energy cost or usage.

In one embodiment of the invention depicted in FIG. 1, a server 101 receives a plurality of parameters including an external weather forecast 102, a utility pricing structure 103, and/or a user preference 104. The server also receives the internal structure temperature 105 and historical data 106 related to the HVAC system 107. The server 101 is used to generate a model. The model is configured to determine a change to an operational state of the HVAC system needed to obtain a temperature set point 108 based on the internal and external temperatures of the structure, the utility pricing structure 103, the user preferences 104, and/or the internal temperature 105 and historical data 106 related to the HVAC system 107. The server 101 iteratively processes the model using the result of a previously generated model and/or a plurality of additional parameters including future utility pricing structures, future user preferences, and/or future weather conditions. The server 101 stores external weather forecast 102, a utility pricing structure 103, user preference data 104, internal structure temperature 105 and historical data 106, and model data in a local or online storage device 109.

In the present embodiment, the internal structure temperature 105 and historical data 106 may be received from one or more HVAC systems 107 within a single structure. The external weather forecast data 102 may contain present and future external temperature parameters such as an external temperature, a humidity rating, and/or a cloud coverage rating. The user preferences 104 may comprise a comfort and tolerance level, a time of day setting, and/or an activity setting.

Figure 2:
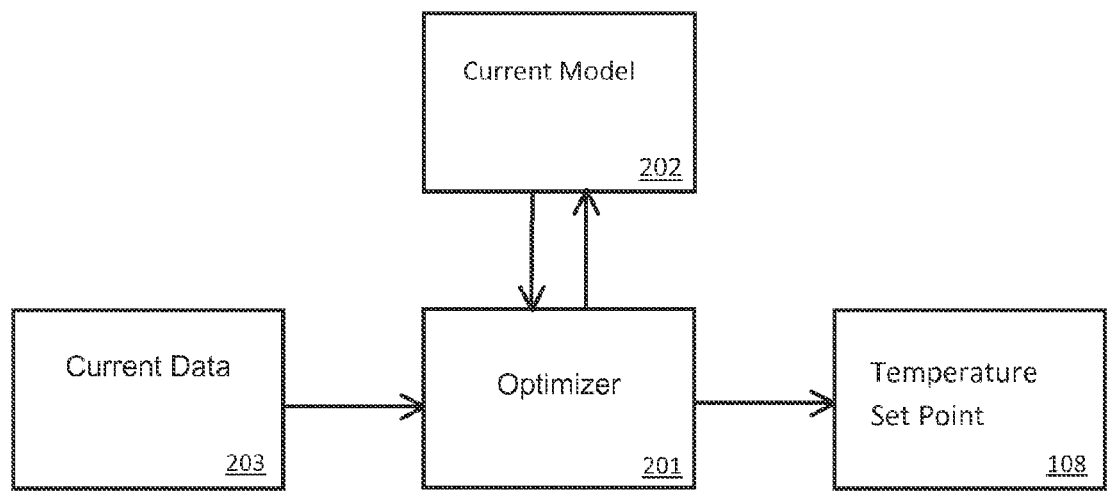
FIG. 2 depicts a block diagram of set point optimization according to an implementation of the disclosed system.

In other aspects of the invention shown in FIG. 2, further details of the operations within server 101 are shown. An optimizer 201 receives inputs from a current model 202 and a current data set of conditions 203 to determine the temperature set point 108 for an HVAC system. The optimizer 201 may use a heuristic algorithm such as a genetic algorithm or particle swarm algorithm to efficiently generate the temperature set point 108 based on the inputs from the current model 202 and current data set 203.

Figure 3:
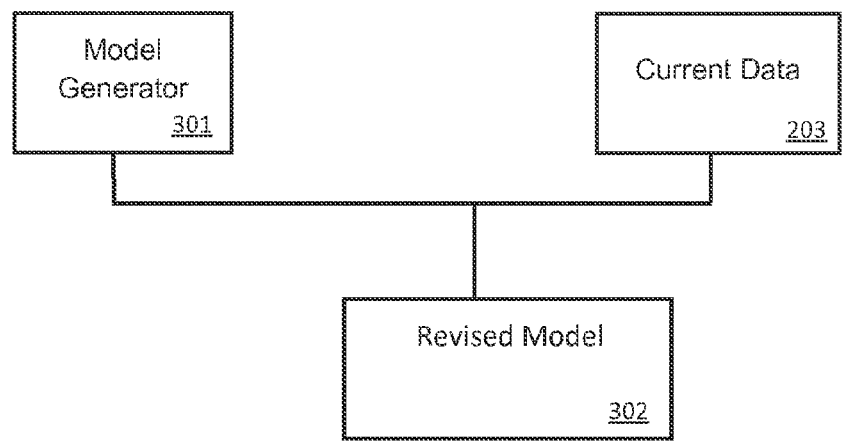
FIG. 3 depicts a block diagram of model generation and revision according to an implementation of the system.

In other aspects of the invention shown in FIG. 3, further operations within server 101 are shown. Here, a model generator 301 generates a revised model 302, the revised model 302 may be generated using linear regression or artificial neural networks (ANN). The ANN model has advantages of being able to capture non-linearities in the system. The system and method may then revise the coefficients or weights used to generate the revised model 302 based on a plurality of additional parameters and constantly updating current data 203. This process may be performed iteratively for as long as system is in normal use. The revised model 302 becomes the current model 202 for the next time interval used by the optimizer 201 to determine the next temperature set point 108.

Figure 4:
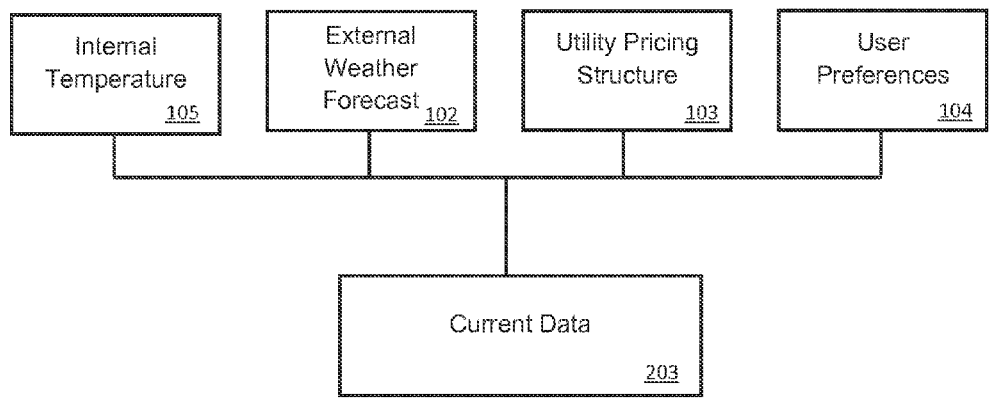
FIG. 4 depicts an example of current data used by an implementation of the disclosed system.

In another aspect of the invention depicted in FIG. 4, the server 101 may receive current data 203 from the plurality of parameters which may include an internal temperature of a structure 105, an external weather forecast 102, a utility pricing structure 103, and/or a user preference 104. The internal temperature may be received from a plurality of HVAC systems within a single structure. The external temperature forecast 102 may be determined using a plurality of external temperature parameters such as an external temperature reading, a humidity rating, and/or a cloud coverage rating. The external temperature reading may be configured to be received from a plurality of sources such as a weather station, a website, and/or a utility company. The utility pricing structure 103 may be received from a plurality of sources such as a utility company, a website, and/or user inputs. The user preferences 104 may comprise a comfort and tolerance level, a humidity rating, and/or a cloud coverage rating. The plurality of parameters used to generate the model may be received at various stages of the process and/or in various orders. The plurality of parameters may be stored on a local or an online storage device. The plurality of parameters may be referenced by the system and method throughout the entire process. The system and method may use some or all of the parameters received.

Figure 5:
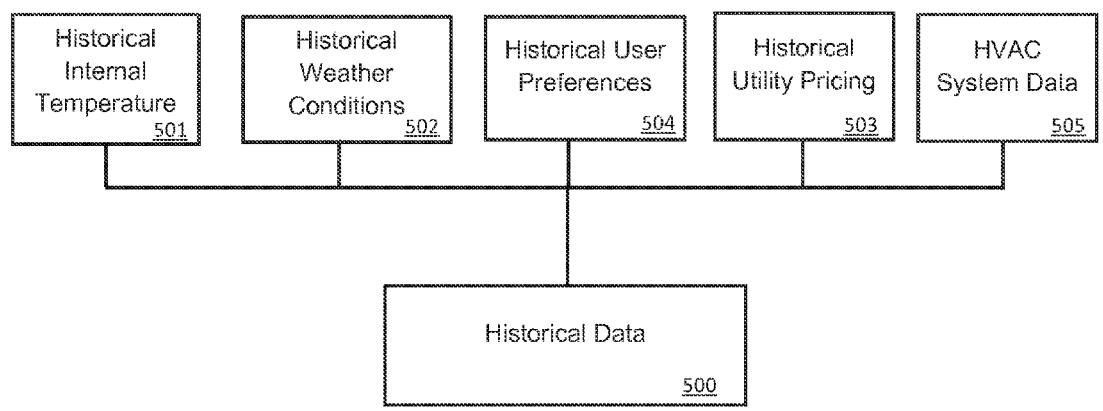
FIG. 5 depicts an example of historical data used by an implementation of the disclosed system.

In another aspect of the invention depicted in FIG. 5, the system and method may receive by the server a plurality of historical data related to the HVAC system. The historical data 500 received may be used as parameters to configure the revised model 302. The historical data may comprise historical internal temperature of the structure 501, historical weather conditions 502, historical user preferences 503, historical utility pricing structures 504, and historical HVAC system data 505. The historical data 500 may be received from a plurality of sources and may be received at various stages of the process and/or in various orders. The historical data 501, 502, 503, and 504 may be stored using local or online storage device 109. The historical data may be referenced by the server 101 throughout the entire process. The system and method may use some or all of the historical data received.

In other embodiments, the historical data of the structure may be used by the system and method to generate reports for use by another party such as a local utility company. The historical data may represent the historical pricing, preference, and/or usage rate of a utility within a certain geographical area. The historical data may be stored on a local or online storage device 109. Access to such data may be determined by the system and method.

The server uses historical data 500 as an inputs to the model generator 301. The model generator 301 generates the revised model 302. The revised model 302 becomes the current model 202 that may be configured and used by the optimizer 201 to determine a change to an operational state of the HVAC system needed to obtain an internal temperature set point of a structure. The revised model 302 may be generated using a plurality of model parameters that may or may not already have been received. In some embodiments, the model parameters may include historical data comprising the internal and external temperatures of the structure 501, the utility pricing structures for the HVAC system 502, the user preferences 503, and/or the historical data related to the HVAC system 504. In some embodiments of the invention, only the current internal and external temperature 501 and historical data related to the HVAC system 504 are used. The revised model 302 may be created using the model generator 301 in various time intervals using newly received parameters.

Figure 6:
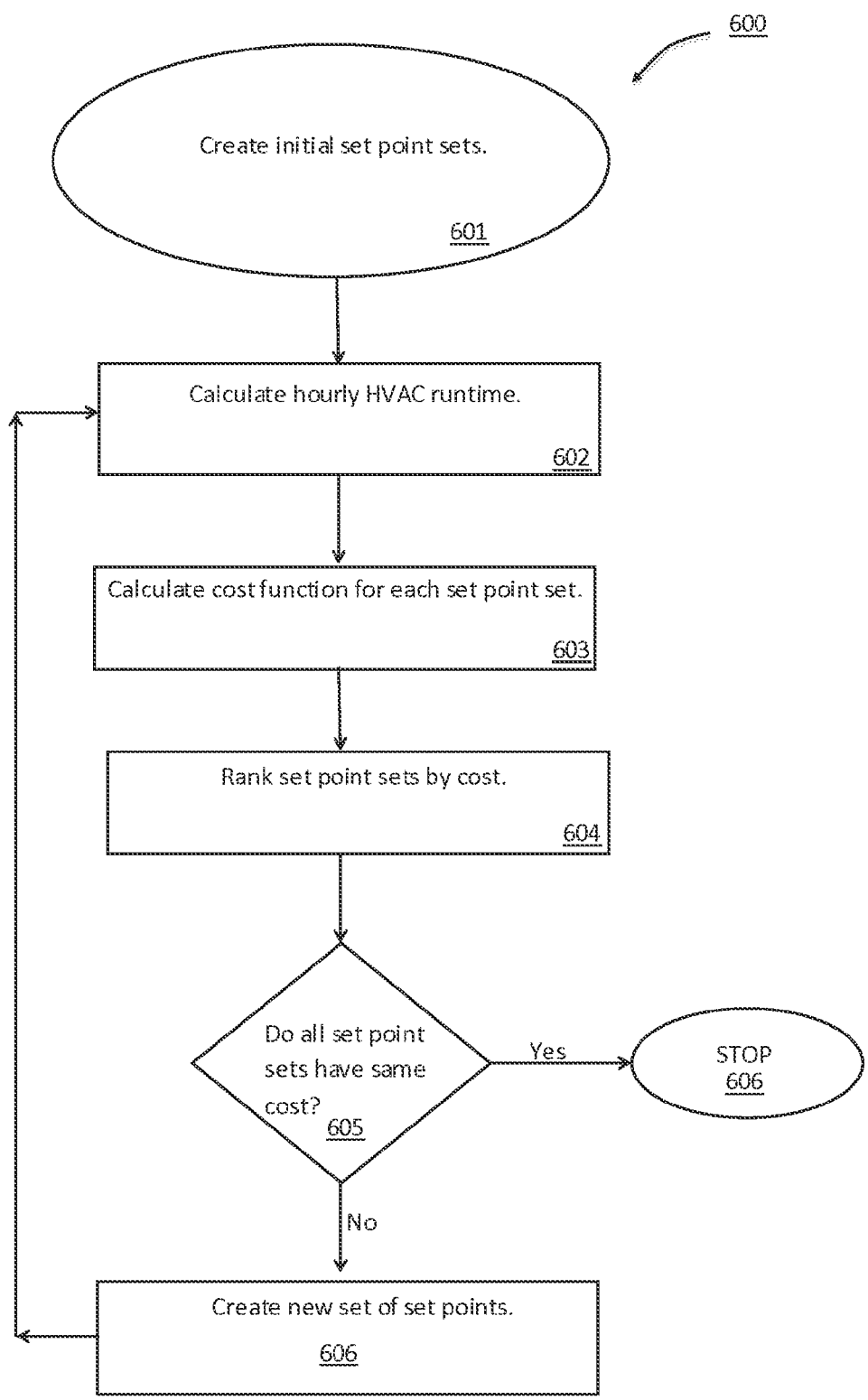
FIG. 6 depicts an example of an algorithm used in accordance with an implementation of the system.

In other aspects of the invention depicted in FIG. 6, the algorithm 600 that the optimizer 201 uses to determine the temperature set point 108 is described. In a first step 601 of algorithm 600, the optimizer 201 starts with random number N sets of set point values for next 24 hours that lie between the minimum and maximum temperature determined by users comfort.

In a next step, 602, the optimizer 201 calculates the hourly HVAC runtime $HVT_n$ for each of N sets of set points by using the current model 202. During a subsequent step 603, the optimizer evaluates the cost by summing the products of the HVAC running time, $HVT_n$ and the utility pricing, $UP_n$ for each hour n over a 24 hour period. The procedure for obtaining the cost my be expressed mathematically using the following relationship:

$$\text{Cost} = \Sigma_{n=1}^{24} HVT_n \cdot UP_n.$$

At the next step, 604, the optimizer ranks each cost for the N sets of set points from lowest cost to highest cost. This step is followed by step 605 where the optimizer 201 determines whether or not the values of the cost for each of the N sets of set point values vary by more than a pre-determined amount. If the value of the cost varies by more than this pre-determined amount, the optimizer 201 then proceeds to a next step 606 where a genetic algorithm performs genetic manipulation of selection, crossover, and mutation on the N sets of set points to create new N sets of set points. Without departing from the scope of the invention, other heuristic algorithms including particle swarm algorithms may be used to execute step 606. The optimizer 201 then repeats steps 601-604 followed by the evaluation step 605 where the variation in the cost for each of the N sets of set points is again evaluated. If the variation in the cost for each of the N sets of set points falls within the amount of variation allowed, the optimizer 201 stops the optimization procedure at step 606 and selects the set of set points with the lowest cost. The chosen set of set points may be updated hourly or as often as desired based on the external weather forecast 102 and the utility pricing structure 103. Should contact to the external weather forecast 102, utility pricing structure be lost then the current set of set points may be used to control the HVAC system for the next 24 hours and may be repeated as long as needed.

Figure 7:
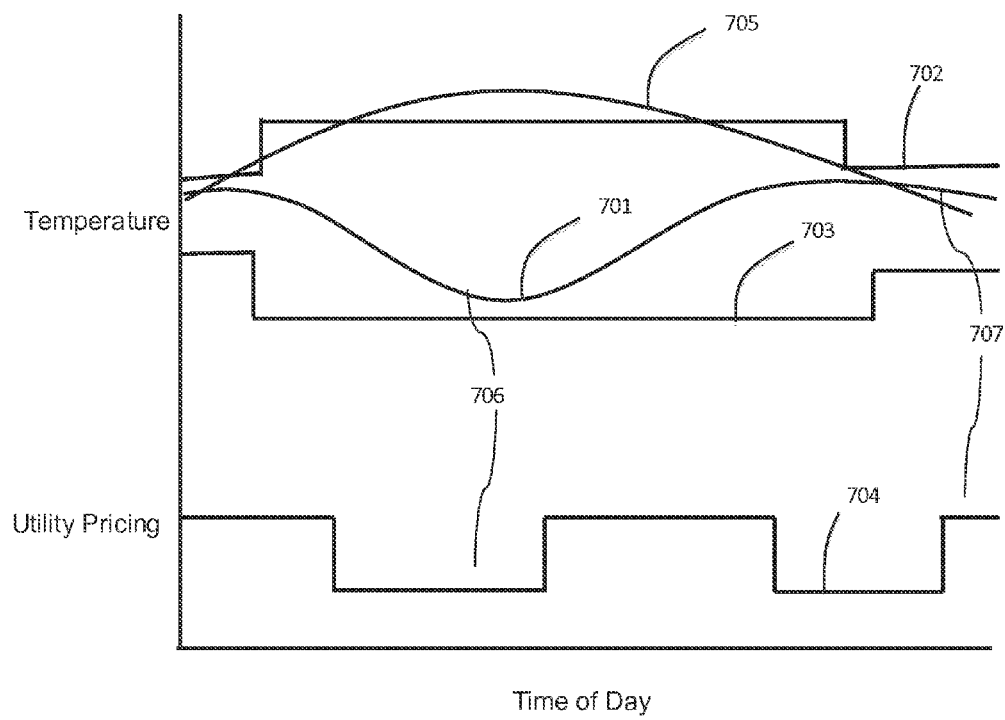
FIG. 7 depicts a graph showing an example of operation of the system and method to reduce energy usage or cost of operation on a hot day.

FIG. 7 illustrates the operation of one embodiment of the invention on a hot day. Here the system and method may minimize energy usage or cost of operation of HVAC system while at the same time meeting the user's preferences. For example, if a user desires a certain comfort level during a specific time of day, the system will use that information to determine that the internal temperature 701 within a structure during a specific time of day using a high temperature limit 702 and a low temperature limit 703. The system and method may then take into consideration the current energy cost 704 based on the utility pricing structure 103 as well as the external temperature 705 based on the external weather forecast 102 during that specific time of day. It minimizes the energy usage or cost of HVAC operation by sending optimal future temperature 108 while maintaining the internal temperature 701 of the structure between the high and low temperature limits 702 and 703. In the present example of a hot day depicted in FIG. 6, the system saves energy usage or cost of HVAC operation by pre-cooling the internal structure during a first condition 706 of a period of a low energy cost 704 and a high external temperature 705. A second condition 707 of not maintaining the cool temperature if the future weather condition will also cool the internal temperature may also be used to minimize energy usage or the cost of HVAC. The user may set and/or adjust their comfort level preferences represented by the high and low temperature limits 702 and 703 in advance. For example, the user may have various comfort level settings during the work week, during weekends, and/or different preferences for morning and/or night. When the system and method creates the revised model 302, it may take into account future comfort level preferences. In another aspect of the invention, the system and method may send a signal, via a server, back to the HVAC system. The signal may be configured to affect the current and future set points 204 of the HVAC system.

Figure 8:
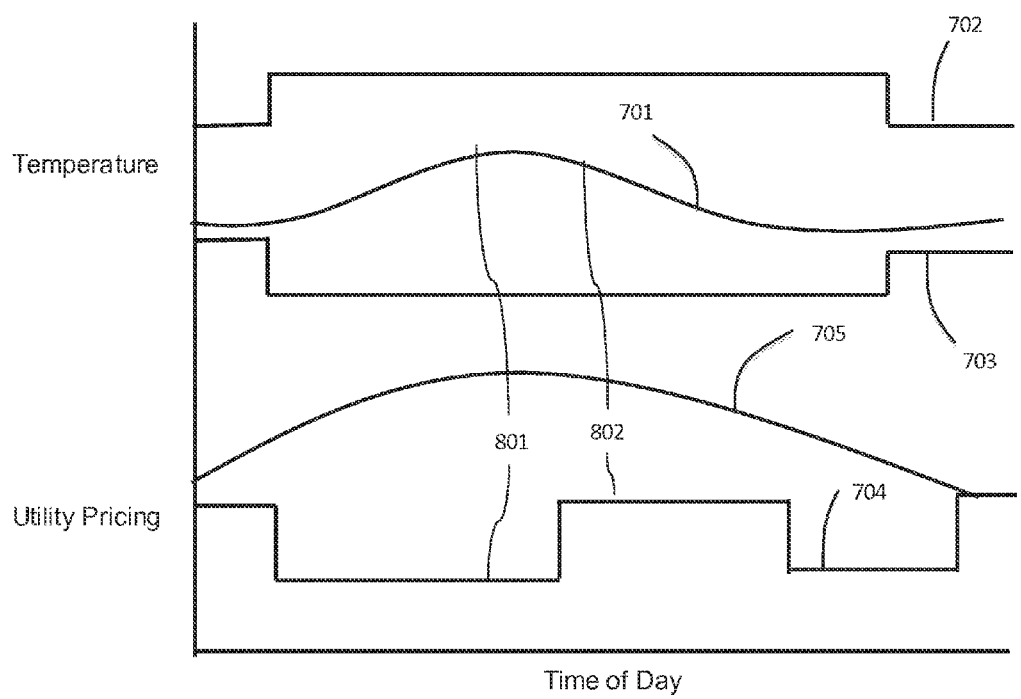
FIG. 8 depicts a graph showing an example of operation of the system and method to reduce energy usage or cost of operation on a cold day.

In another aspect of the invention showing operation of the system and method on a cold day depicted in FIG. 8, the system and method keeps the internal temperature 701 within the bounds set by the high and low temperature limits 702 and 703 while saving energy usage or cost of HVAC operation during the condition 801 by pre-heating the internal structure during a period of low energy costs 704 and low external temperature 705. The system and method may also save energy or the cost of HVAC operation during the condition 802 by not maintaining a warm temperature if the future weather conditions and higher external temperatures 705 warm the house during a period of high energy costs 704.

Figure 9:
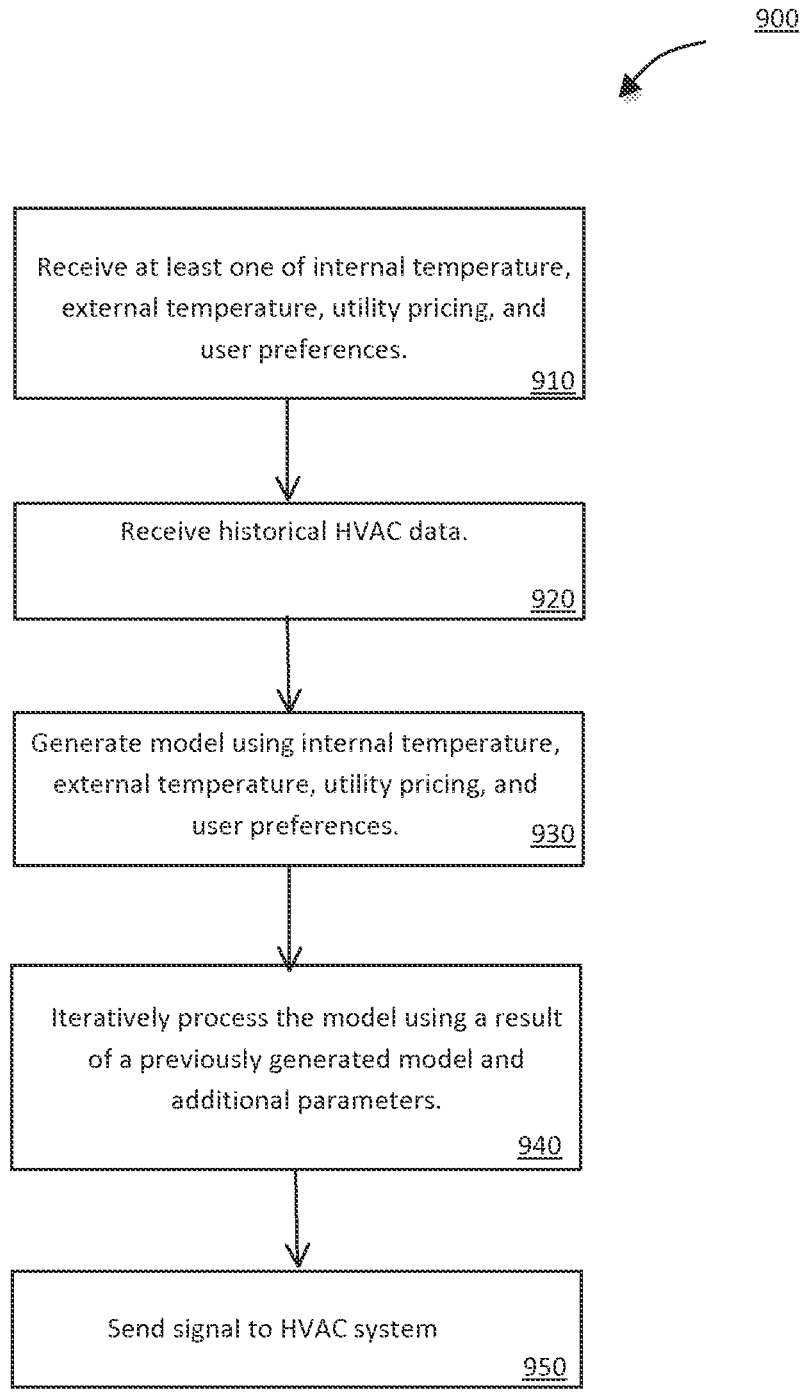
FIG. 9 depicts a block diagram of an implementation of a method for optimizing or reducing energy cost or usage.

FIG. 9 depicts a block diagram of a method 900 for optimizing and reducing energy usage or cost or operation in an automatically controlled HVAC system. As shown, in a step 910 a server receives a plurality of parameters such as for example, internal temperature, external temperature, utility pricing, and user preferences. In a step 920, the server may also receive historical HVAC data. In a step 930, a server may generate a model using internal temperature, external temperature, utility pricing, and user preferences. In a step 940, a server may iteratively process the model using a result of a previously generated model and additional parameters. The additional parameters may include a future utility pricing structure, a future user preference, and a future weather condition. In a step 950, a server may send a signal to the HVAC system, the signal configured to affect a current operational state of the HVAC system.

We claim:

1. A method for optimizing and reducing the energy usage or cost of operation of an automatically controlled heating, ventilation and air conditioning ("HVAC") system, comprising:

receiving, by a server, a plurality of parameters, the parameters comprising:
an internal temperature of a structure;
an external temperature;
a utility pricing structure; and
an user preference;

receiving, by the server, a plurality of historical data related to the HVAC system;

generating, by the server, a model configured to determine a change to an operational state of the HVAC system needed to obtain an internal temperature set point, wherein the model is further configured to be generated using a plurality of model parameters comprising:
the internal and external temperatures of the structure;
the utility pricing structure;
the user preference;
future weather forecast of a geographic area to be served; and
the plurality of historical data related to the HVAC system;

iteratively processing and updating the model, by the server, using a result of a previously generated model, current data for the plurality of parameters and a plurality of additional parameters, wherein the additional parameters comprise a future utility pricing structure; and a future user preference;

creating initial set point sets, wherein each set point set comprises set point values for a predetermined number of hours;

calculating hourly system runtime for each set point set by using the generated model;

calculating a cost for each set point set based on the calculated hourly system runtime;

ranking the set point sets by the calculated cost;

determining if the costs for each of the set point sets vary by more than a pre-determined amount;

when the costs for each of the set point sets vary by more than the pre-determined amount, creating new set point sets and then returning to the calculating hourly system runtime for each set point set step;

when the costs for each of the set point sets vary by not more than the pre-determined amount, selecting the set point set with the lowest cost; and sending, by the server, a signal to the HVAC system, the signal configured to affect a current operational state of the HVAC system, wherein the signal is the selected set point set.

2. The method of claim 1, wherein the internal temperature is received from a plurality of HVAC systems within a single structure.

3. The method of claim 1, wherein the external temperature is configured to be determined by a plurality of external temperature parameters, comprising at least one of:
an external temperature;
a humidity rating; and
a cloud coverage rating.

4. The method of claim 1, wherein the user preference comprises at least one of:
a comfort and tolerance level;
a time of day setting; and
an activity setting.

5. The method of claim 1, wherein the historical data related to the HVAC system comprises at least one of:
historical internal and external temperatures;
historical weather conditions;
historical user preferences; and
historical utility pricing structures.

6. The method of claim 1, wherein the utility pricing is received from a plurality of sources comprising at least one of:
a utility company;
a website; and
an user input.

7. The method of claim 1, wherein the external temperature and future weather conditions are configured to be received from a plurality of sources, comprising at least one of:
a weather station;
a website; and
an utility company.

8. The method of claim 1, wherein the current operational state of the HVAC comprises:
an ON state;
an OFF state; and
a MAINTAIN state wherein the current operational state of the HVAC remains unchanged.

9. The method of claim 1, wherein the signal to the HVAC system is an optimized set point, the set point parameters being computed using a genetic algorithm.

10. The method of claim 1, further comprising the steps of:
pre-cooling the structure to a temperature between a high and low temperature limit during a period of a low energy cost and a high forecasted external temperature;
obviating cooling of the structure by the HVAC system if a forecasted weather condition will cool the structure; and
pre-heating the structure to a temperature between a high and a low temperature limit during a period of a low energy cost and a low forecasted external temperature.

11. A method for optimizing and reducing the energy usage or cost of operation of an automatically controlled heating, ventilation and air conditioning ("HVAC") system, comprising: receiving, by a server, a plurality of parameters, the parameters comprising: an internal temperature of a structure; an external temperature; an utility pricing structure; and an user preference; receiving, by the server, a plurality of historical data related to the HVAC system;

generating, by the server using the received parameters and historical data, a model configured to determine a change to an operational state of the HVAC system needed to obtain an internal temperature set point;

creating initial set point sets, wherein each set point set comprises set point values for a predetermined number of hours;

calculating hourly system runtime for each set point set by using the generated model;

calculating a cost for each set point set based on the calculated hourly system runtime;

ranking the set point sets by the calculated cost;

determining if the costs for each of the set point sets vary by more than a pre-determined amount;

when the costs for each of the set point sets vary by more than the pre-determined amount, creating new set point sets and then returning to the calculating hourly system runtime for each set point set step; when the costs for each of the set point sets vary by not more than the pre-determined amount, selecting the set point set with the lowest cost; and sending, by the server, a signal to the HVAC system, the signal configured to affect a current operational state of the HVAC system, wherein the signal is the selected set point set.

12. A system of processor-executable instructions that when executed by a server, optimize and reduce the energy usage or cost of operation of an automatically controlled heating, ventilation and air conditioning ("HVAC") system by instructing the server to:
receive a plurality of parameters, the parameters comprising:
an internal temperature of a structure;
an external temperature;
an utility pricing structure; and
an user preference comprising a comfort level, a tolerance level, and a time of day setting;
generate a model configured to determine a change to an operational state of the HVAC system needed to obtain an internal temperature set point, wherein the model is further configured to be generated using a plurality of model parameters comprising:
the internal and external temperatures of the structure;
the utility pricing structure; the user preference;
future weather forecast of a geographic area to be served; and
the plurality of historical data related to the HVAC system;
create initial set point sets, wherein each set point set comprises set point values for a predetermined number of hours;

calculate hourly system runtime for each set point set by using the generated model;
calculate a cost for each set point set based on the calculated hourly system runtime;
rank the set point sets by the calculated cost;
determine if the costs for each of the set point sets vary by more than a pre-determined amount;
when the costs for each of the set point sets vary by more than the pre-determined amount, create new set point sets and then return to the calculating hourly system runtime for each set point set step;
when the costs for each of the set point sets vary by not more than the pre-determined amount, select the set point set with the lowest cost; and
and
send a signal to the HVAC system, the signal configured to affect a current operational state of the HVAC system, wherein the signal is the selected set point set.

13. The system of claim 12, wherein the external temperature is configured to be determined by a plurality of external temperature parameters, comprising at least one of:
an external temperature;
a humidity rating; and
a cloud coverage rating.

14. The system of claim 12, wherein the historical data related to the HVAC system comprises:
historical internal and external temperatures;
historical weather conditions;
historical user preferences; and
historical utility pricing structures.

15. The system of claim 12, wherein the additional parameters comprise at least one of:
a future utility pricing structure; and
a future user preference.

16. The system of claim 12, wherein the utility pricing is received from a plurality of sources comprising at least one of:
a utility company;
a website; and
an user input.

17. The system of claim 12, wherein the external temperature and future weather conditions are configured to be received from a plurality of sources, comprising at least one of:
a weather station;
a website; and
an utility company.

18. The system of claim 12, wherein the current operational state of the HVAC comprises:
an ON state;
an OFF state; and
a MAINTAIN state wherein the current operational state of the HVAC remains unchanged.

19. The system of claim 12, wherein the signal to the HVAC system is an optimized set point, the set point parameters being computed using a genetic algorithm.

20. The system of claim 12, wherein the system saves energy by pre-cooling the structure to a temperature between a high and low temperature limit during a period of a low energy cost and a high forecasted external temperature; and during a second period not maintaining a cool comfort level temperature if a forecasted weather condition will cool the structure, and wherein the system further saves energy by pre-heating the structure to a temperature between a high and a low temperature limit during a period of a low energy cost and a low forecasted external temperature.

* * * * *